(No Model.)
S. M. GUNSAUL.
PNEUMATIC HANDLE.
No. 584,220.  Patented June 8, 1897.
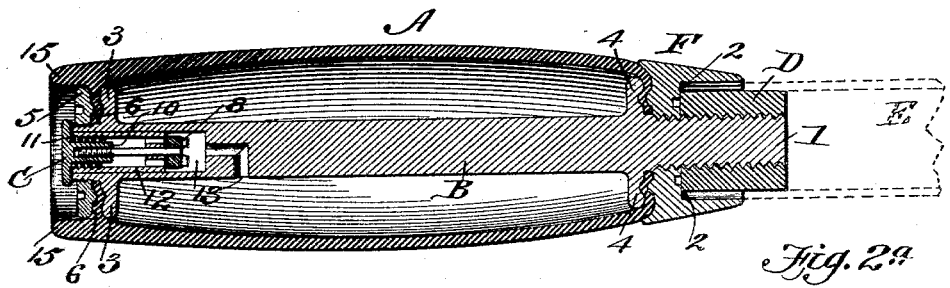
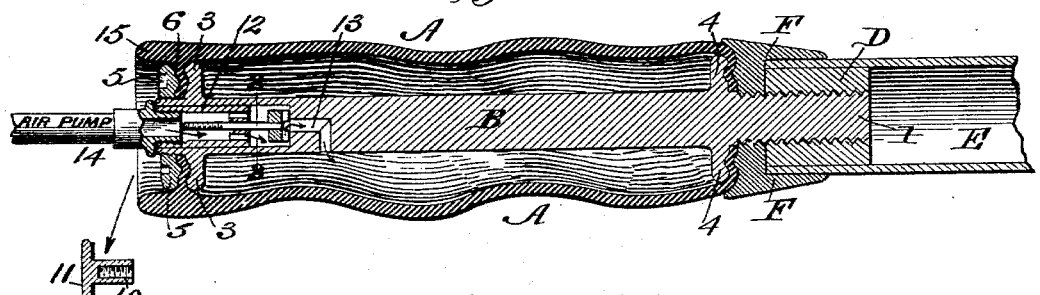
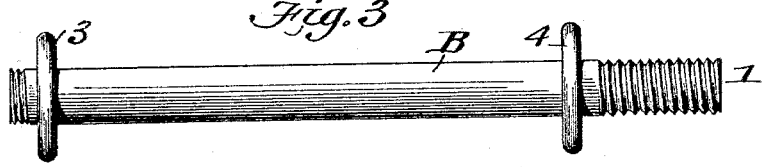
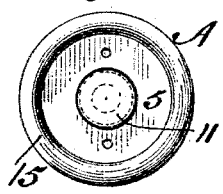
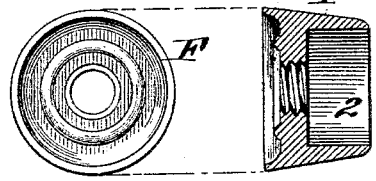
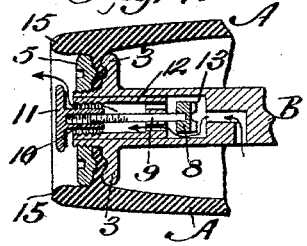
WITNESSES:
M. D. Bloudel.
Amos W. Hart
INVENTOR
S. M. Gunsaul
BY Munn & Co.
ATTORNEYS.
THE NORRIS PETERS CO., PHOTO-LITHO., WASHINGTON, D.C.

UNITED STATES PATENT OFFICE.

SEWARD M. GUNSAUL, OF OMAHA, NEBRASKA, ASSIGNOR TO THE S. M. GUNSAUL COMPANY, OF SAME PLACE.

PNEUMATIC HANDLE.

SPECIFICATION forming part of Letters Patent No. 584,220, dated June 8, 1897.

Application filed July 11, 1896. Serial No. 598,841. (No model.)

*To all whom it may concern:*

Be it known that I, SEWARD M. GUNSAUL, of Omaha, in the county of Douglas and State of Nebraska, have invented a new and Improved Pneumatic Handle, of which the following is a specification.

The sanitary and other objections to rigid or inelastic bicycle-handles have led to the devising of elastic handles of two principal kinds or types—namely, the cork and pneumatic. I have devised and put in use pneumatic handles which are of a greatly-improved construction and meet all practical requirements.

The construction, arrangement, and combination of parts embodying such invention are as hereinafter described and claimed, and shown in accompanying drawings, in which—

Figure 1 is a central longitudinal section of my improved pneumatic handle or attachment, showing the elastic body of the same distended. Fig. 2 is a similar view of the handle, showing the elastic body collapsed and an air-pump attached as required for inflating it. Fig. 2ª is a detail cross-section on line 2 2 of Fig. 2. Fig. 3 is a plan view of the metal stem of the handle. Fig. 4 is an end view of the handle. Fig. 5 includes a longitudinal section and an end view of the socket or thimble nut forming part of the handle attachment. Fig. 6 is an enlarged perspective view of the air-valve proper detached. Fig. 7 is a sectional view of the outer end of the handle, illustrating the operation of deflating the latter. Fig. 8 is a section of a metallic antifriction-washer, hereinafter referred to.

The elastic body or casing A of the handle is secured to the steel or iron stem B, and the latter has a bore in its outer end in which is fitted an air inlet and outlet valve C.

The inner and extended end 1 of the stem B is screw-threaded to adapt it to enter a correspondingly-threaded bore in a nut D, secured in the end of an ordinary tubular bicycle handle-bar E, (shown in dotted lines in Fig. 1,) and said parts D E are fitted in the outer socket 2, Fig. 5, of a double-flanged or thimble nut F, which is also screwed on the handle-stem B.

The elastic body A is secured to the stem B by the following means: Said stem is constructed with two integral circular flanges or abutments 3 4, which are located near its respective ends. Each of the abutments has an annular groove in its outer side. A circular nut 5, having an annular rib corresponding to the said grooves, is applied on the outer threaded end of stem B, and when screwed home clamps and compresses the inwardly-projecting lip or flange 6 of the elastic body A between itself and the adjacent abutment 3. The other inturned end of the body A is similarly clamped between the abutment 4 and the thimble-nut F, as shown. The outer sides of said nuts are provided with sockets to provide for application of a spanner for screwing them to place on the stem B. If desired, a grooved and ribbed washer 7, Fig. 8, may be interposed between the abutments 3 4 and nuts 5 and F to relieve undue friction in screwing up the nuts. It will be seen that the double-socket or thimble nut F not only serves to clamp the body A to the abutment 4, as described, but forms a smooth and ornamental filling or finish piece for the joint between the handle A and handle-bar E, as well as strengthens the handle attachment at that point.

The cylindrical nut D is rigidly secured in the open end of the tubular handle-bar E, preferably by brazing, and the handle attachment proper is then applied by screwing the stem B into said nut, as shown in Figs. 1 and 2, which nut D then jams with the nut F and thus locks it. When the attachment is furnished independently to bicycle manufacturers or dealers, the nut D may be included and shipped as part of the same.

Different sizes of nuts 5 and F may be furnished in the case of bicycles having handle-bars of different diameters, or the nuts may have a uniform size and the same fitted to special handle-bars by turning or reaming or by applying a sleeve or bushing, as required.

The valve attachment consists of the valve proper, 8, Fig. 6, having a threaded stem 9, the tubular screw 10, Figs. 1 and 2, having an enlarged head 11, and the tubular valve guide and seat 12. The latter is secured, preferably brazed, in the endwise bore 13 of the handle-stem B. Its inner end is constructed to form both a seat for the valve and a guide for the valve-stem. (See Fig. 2ª.) The valve-stem 9 is adapted to screw into the tubular screw 10, as shown in Fig. 1. The valve 8 seats normally against the inner end of the tubular guide 12, in which position it is held by the screw 10, and thus closes the passage to inlet or outlet of air. It may be adjusted to open the passage by rotating the screw 10. The inner end of the valve 8, Fig. 6, is recessed or provided with grooves, so that when in contact with the abutment at the inner end of the bore 13 in stem B the passage of air will not be cut off.

The operation of parts in inflating a collapsed handle A is illustrated in Fig. 2. First the screw 10 is removed and then the nozzle 14 of an ordinary bicycle air-pump screwed into the tubular guide 12. Upon operating said pump the inward passage of air forces the valve 8 off its seat and against the abutment or inner end of bore 13, as shown, and air passes through the grooves in the head of the valve and out through the reduced lateral bore in the stem. When the body A is distended to the required degree, Fig. 1, the operation of the pump being arrested, the valve 8 seats itself on the guide 12, as shown, and effectually prevents escape of air. The pump-nozzle 14 is then screwed out and the screw 10 reinserted and rotated to draw and hold the valve tightly to its seat, as shown in Fig. 1. Should it be found that the distention of the handle A exceeds the desired degree, it may be quickly deflated, which is effected (see Fig. 7) by screwing the screw 10 part way off the valve-stem and out of the guide 12 and then pressing on the head 11 of said screw to force the valve off its seat one or more times for an instant only. I thus provide for admission and escape of air and easy regulation of the degree of distention and firmness of the body A by one and the same valve attachment. The arrangement of the latter in a bore in the stem B also affords perfect protection for it, as well as economizes space and avoids an unsightly projection on the handle.

The outer end 15 of the handle-body A is extended beyond the interior flange 3, thus forming an annular buffer or cushion, which protects the handle-bar and machine as a whole from severe shock or jar in falling, as well as surrounds and specially protects the metal parts at the outer end of the handle.

The body A may be composed of rubber vulcanized to any preferred degree or of rubber or other preferred elastic fabric. In this respect, as in others, I desire it to be understood that I do not restrict myself to details, save as hereinafter specified, nor as to the application or use of my invention as a handle.

What I claim is—

1. The combination, with a suitable threaded supporting-stem having abutments arranged thereon as specified, a handle-casing working over against said abutments and partly encompassing the stem, such handle-casing being approximately cylindrical and provided with end flanges or lips and a projecting head, the same being of flexible elastic air-tight material, outer nuts working upon said stem and against said lips, in combination with a suitable valve, all arranged substantially as shown and described.

2. The improvement in bicycle-handles, consisting of the combination, with the tubular handle-bar proper and a nut secured in the end of the same, of the handle-stem having abutments, and a threaded end that screws into said nut, the flexible air-tight handle-casing, and the nut F, which screws on the stem and is recessed in each end, and tapered exteriorly as shown and described, whereby it incloses the end of the handle-bar and coacts with the abutments and flange, or inturned portion, of the casing, and thus forms a reinforce, clamp, and finish-piece, as specified.

SEWARD M. GUNSAUL.

Witnesses:
SOLON C. KEMON,
AMOS W. HART.